UNITED STATES PATENT OFFICE.

W. R. FRINK, OF VIRGINIA, NEVADA TERRITORY.

IMPROVED PROCESS FOR AMALGAMATING ORES OF SILVER.

Specification forming part of Letters Patent No. 43,983, dated August 30, 1864.

*To all whom it may concern:*

Be it known that I, W. R. FRINK, of Virginia, in the county of Storey and Territory of Nevada, have invented a new and Improved Process for Amalgamating Silver Ores; and I do hereby declare that the following is a full, clear, and exact description thereof, which will enable those skilled in the art to make and use the same.

This invention consists in the application or use in amalgamating silver ores of metallic copper precipitated from the sulphate of copper by the addition of iron, or finely divided by any other suitable means in such a manner that the chloride of silver is readily reduced to the metallic state, and the silver is thereby predisposed to amalgamate at the expense of copper intead of the quicksilver, and a large amount of quicksilver can thereby be saved.

In carrying out my process I first dissolve a quantity of sulphate of copper in hot water, and to this solution I add cast-iron turnings or filings sufficient to precipitate the copper. The precipitated copper, mixed with the sulphate of iron formed in this decomposition, is put aside, and the silver amalgam is chloridized by mixing it with common salt, black oxide of manganese, and sulphuric acid in a large pan with a suitable agitator or muller, and after the mixture of the silver with the salt, manganese, and sulphuric acid has been run in the pan for about two hours I add the precipitated copper and iron.

By use of metallic copper in the manner above described the amalgamation of the silver is rendered more complete than before, and, furthermore, there is no loss of quicksilver in a chemical point of view, since the finely-pulverized metallic copper will restore back to a metallic state all that may be chloridized.

It is not at all injurious in this process to use an excess of copper, though it is the safest in all cases to employ the various materials as near as possible in chemical equivalent. However, if silver is present in the ore, an excess of copper will not be permanently amalgamated, but may be readily separated by trituration in a motor or by regrinding in a pan.

The copper, on being mixed with the amalgam, attaches itself to the quicksilver and surrounds the globules of the same with a coating of copper, so that the latter is first presented to the chloride of silver, reducing the silver to a metallic state, and enabling it to amalgamate at the expense of copper instead of at the expense of quicksilver, the result being chloride of copper and silver amalgam without any chloride of mercury. The saving in mercury effected by these means is immense, and I have been enabled to reduce the loss of this costly material from three pounds per ton of ore to half a pound.

I claim as new and desire to secure by Letters Patent—

The use of finely-pulverized or precipitated metallic copper, in combination with or without the sulphate of iron or other material used in precipitating, applied in the manner substantially as herein specified, for the purpose of facilitating the process of amalgamating silver with the least possible loss of quicksilver.

W. R. FRINK.

Witnesses:
 DANA S. TURNER,
 S. B. ROONEY.